United States Patent [19]

Colet

[11] Patent Number: 4,578,014
[45] Date of Patent: Mar. 25, 1986

[54] AUTOMOBILE TRAY TRAILER

[76] Inventor: Ralph Colet, 6018 Paxton Ct., San Jose, Calif. 95123

[21] Appl. No.: 552,607

[22] Filed: Nov. 17, 1983

[51] Int. Cl.⁴ ............................................... B60P 3/12
[52] U.S. Cl. ................................... 414/483; 414/484; 414/494; 296/1 S; 280/104; 362/61
[58] Field of Search ............... 414/482, 483, 494, 484; 362/61, 80; 296/1 S; 280/104, 414, 677; 410/9, 10, 30

[56] References Cited

U.S. PATENT DOCUMENTS

| | | | |
|---|---|---|---|
| 1,352,898 | 9/1920 | Houck | 414/494 X |
| 1,451,127 | 4/1923 | Thornton | 414/494 X |
| 2,071,592 | 2/1937 | Thompson | 296/1 S |
| 2,205,273 | 6/1940 | Radey | 410/10 |
| 2,351,829 | 6/1944 | Milner | 414/494 X |
| 2,446,205 | 8/1948 | Wickersham et al. | 280/677 X |
| 2,803,362 | 8/1957 | Saenz | 414/483 X |
| 2,887,238 | 5/1959 | Huber | 414/483 |
| 3,017,840 | 1/1962 | Fairweather | 410/9 X |
| 4,455,119 | 6/1984 | Smith | 410/30 X |

FOREIGN PATENT DOCUMENTS

| | | | |
|---|---|---|---|
| 742482 | 5/1953 | Fed. Rep. of Germany | 296/1 S |
| K4752II | 5/1956 | Fed. Rep. of Germany | 280/677 |

*Primary Examiner*—Joseph E. Valenza
*Assistant Examiner*—Ken Muncy
*Attorney, Agent, or Firm*—Thomas E. Schatzel

[57] ABSTRACT

A self-contained trailer for transporting operative or inoperative motor vehicles. The trailer includes a tiltable flat bed for carrying the vehicle, a supporting framework, a towing bar, and an electric winch tilting mechanism. Six low profile wheels are provided to soften ride and to minimize degree of tilt required for loading and unloading. Aerodynamic features, including air scoops and dams, improve handling and fuel efficiency. Steel construction is used throughout for durability. An alternative embodiment is provided which can carry two autos or one very long vehicle. A second alternative embodiment is laterally expandable for hauling extra-wide vehicles.

14 Claims, 10 Drawing Figures

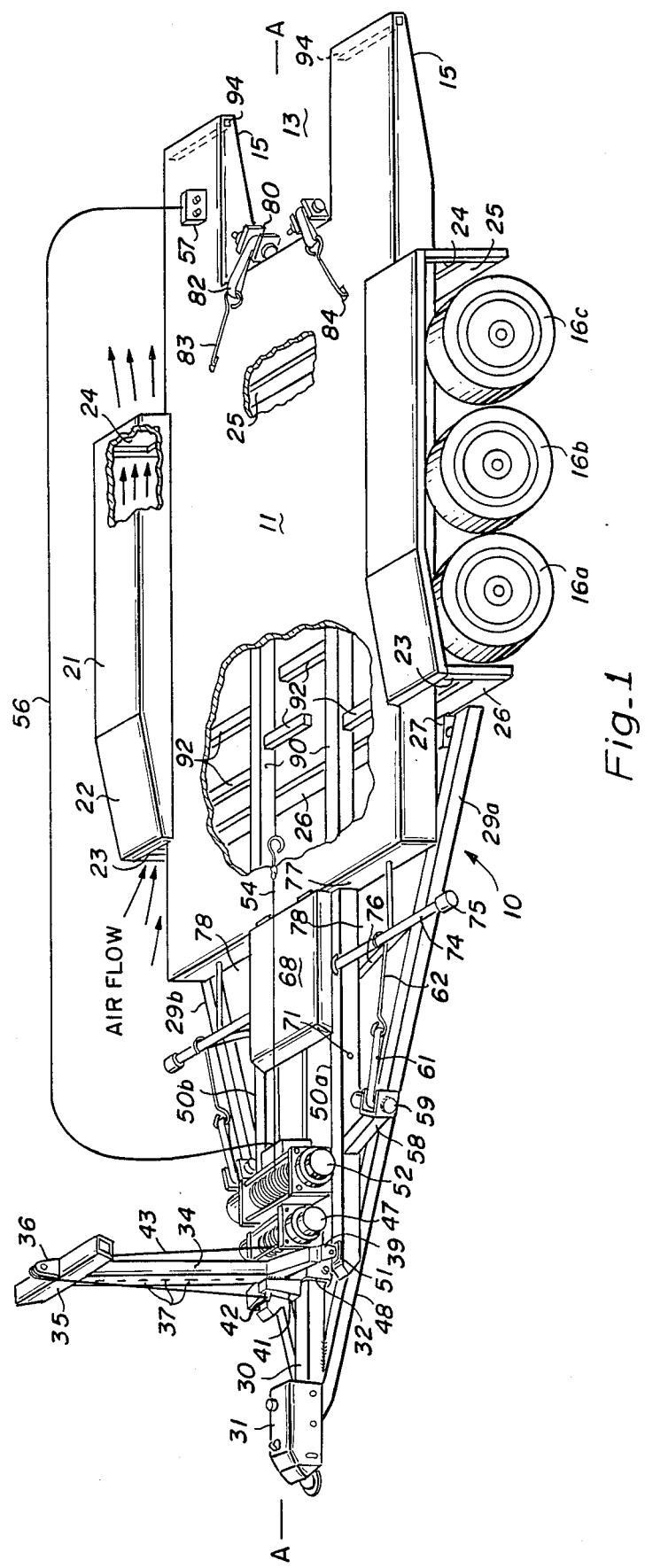

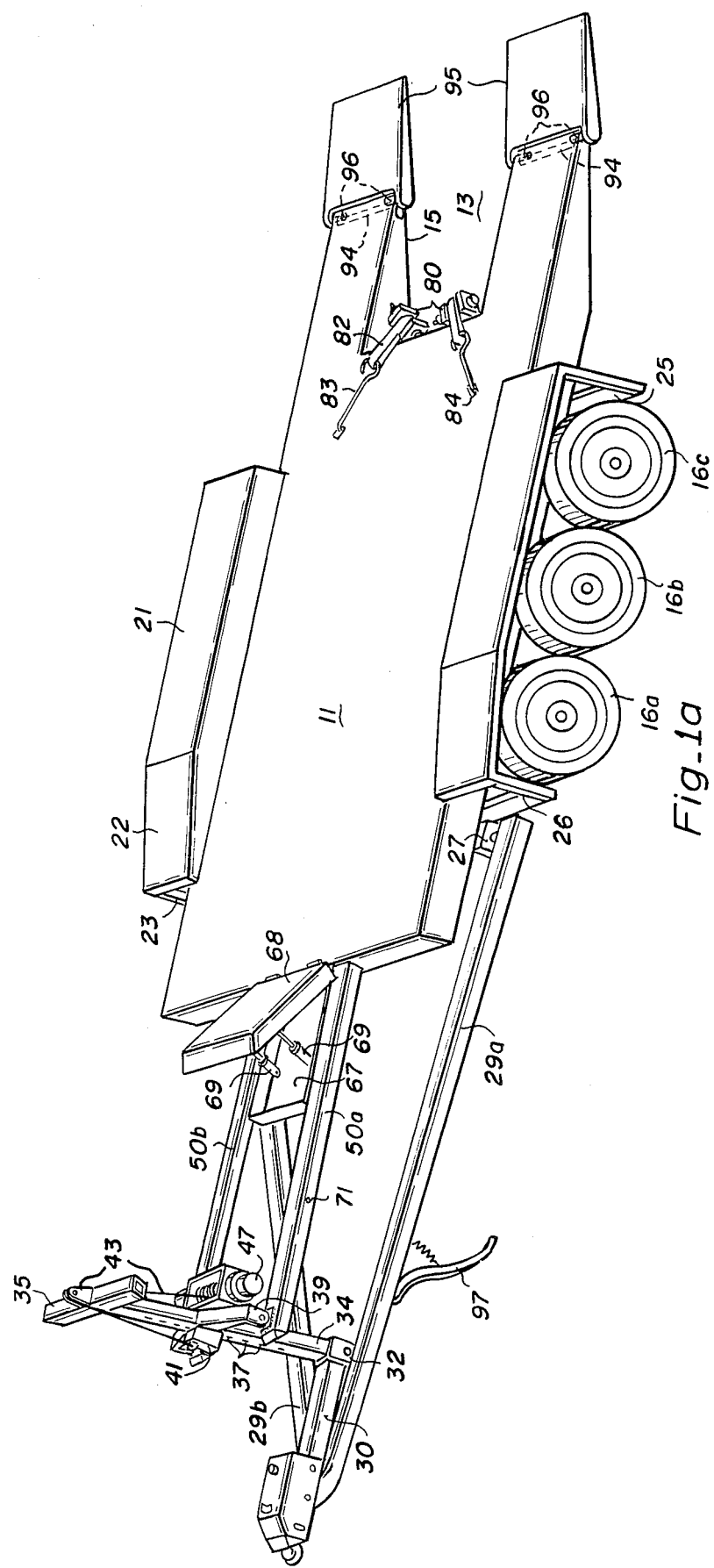
Fig_1a

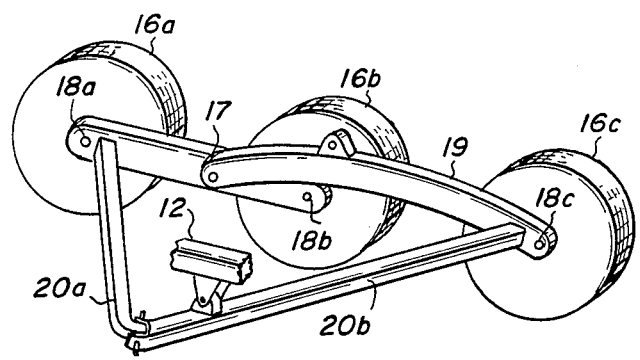
Fig_2
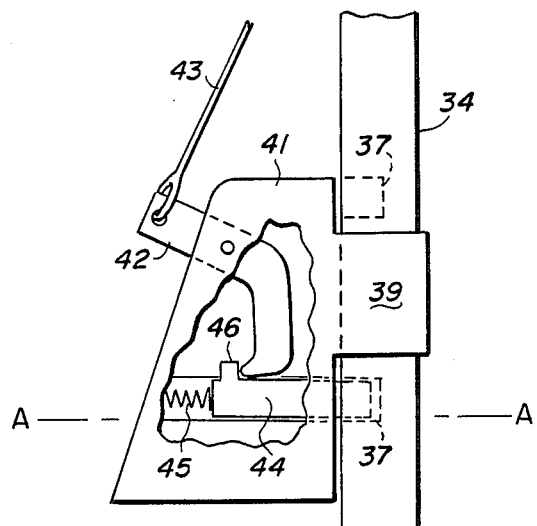
Fig_3a
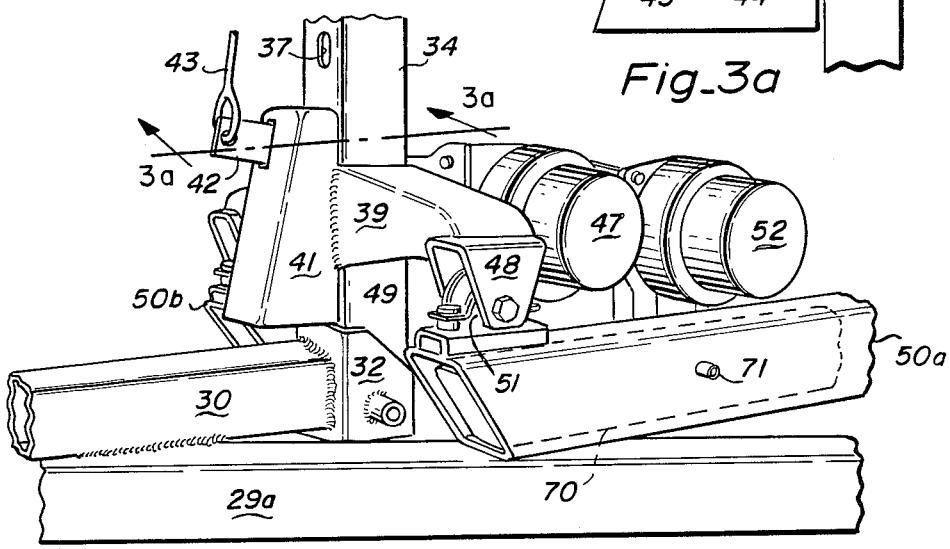
Fig_3
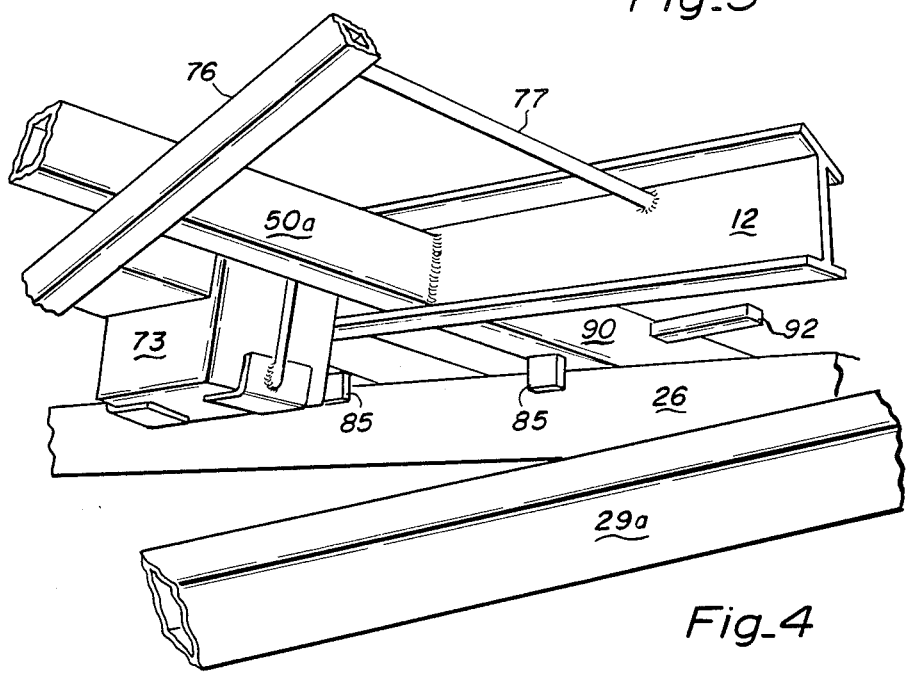
Fig_4

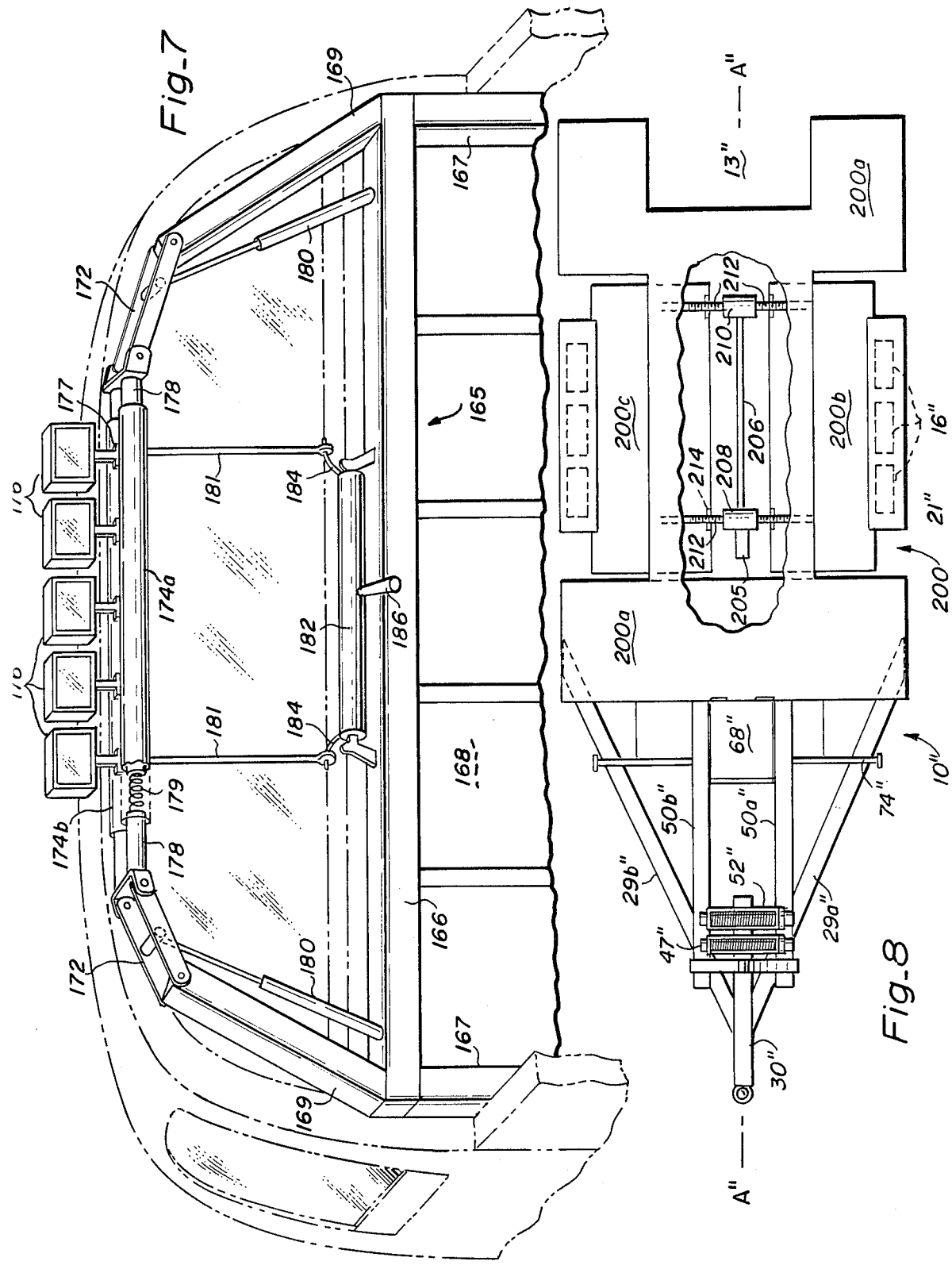

AUTOMOBILE TRAY TRAILER

BACKGROUND OF THE INVENTION

1. Field of the Invention

This invention relates generally to an apparatus for transporting disabled motor vehicles and more particularly, to a tiltable tray-type trailer for transporting disabled automobiles.

2. Description of the Prior Art

Various means of towing, trailering, or moving disabled or inoperative automobiles have been employed. Typical of these are tow trucks or "wreckers" which utilize a hook or cradle attached to a boom on the truck and secured to the automobile's undercarriage to lift one end of the automobile off of the road. Such towing means can damage the towed automobile. The hooking apparatus may physically damage those portions of the automobile which it contacts. Towing a car in a conformation which allows the wheels to turn without power being applied may result in transmission damage.

One attempt at overcoming these problems was the slide-back tray automobile transporter. Conventional slide-backs, however, are mounted on flat-bed trucks. Because of tractive and load carrying requirements, such trucks are necessarily supported by large diameter wheels and tires. This results in a high bed position. The tray itself is hydraulically extended backwards and downwards from the truck. The high bed results in a steep angle, making it difficult to load the vehicle. Additionally, such trucks have the bed positioned directly over the rear axle. The transported vehicle is secured by chains attached to its front and rear, and to the truck bed. When under way, road shocks tend to be applied upwards at the point of the rear axle. These road shocks result in bouncing or "floating" of the transported vehicle during movement. Because the transported car is restrained at either end, the bouncing or floating results in a bending moment being applied to the car, as on a fulcrum. This can bend or damage the vehicle's frame and often results in misalignment of doors. A further disadvantage of this type of vehicle is that the controls for the loading winch and tray are typically located at the side of the vehicle. In situations where a transporter is responding to an accident, it is common that the disabled vehicle be removed from one lane of a multi-lane road, or from a shoulder. In either case, other automobiles are generally using the adjacent lanes. Such side controls of the prior art expose the operator of such equipment to danger from this adjacent traffic.

Several additional disadvantages reside in the prior art apparatus. The conventional slide-back transporters are unitary vehicles. Thus, should failure occur in either the tray system, for example in the hydraulics, or in the truck itself, the entire apparatus is disabled. The unitary tray transporters cannot be driven with the tray in the down position. This hinders or prevents loading of an auto in situations where, due to terrain conditions, the auto is located at an angle relative to the tray. Thus, the unitary transporter is limited in its ability to maneuver, and thus to extricate vehicles from tight situations.

None of the prior art equipment is designed to minimize damage to the transporter and the disabled vehicle in the event of a collision or accident. In the case of the unitary transporter, damage to one portion of the vehicle may render the entire apparatus useless.

None of the prior art have solved the problems of eliminating towing-related damage to the disabled vehicle and providing a cost-effective apparatus to remove and transport automobiles.

SUMMARY OF THE INVENTION

It is therefore an object of the present invention to provide a safe, simple, and economical apparatus for transporting disabled vehicles which prevents damage to the disabled vehicle.

It is an additional object of the present invention to provide a trailer for transporting motor vehicles which is simple and safe for the operator to use.

It is a further object to provide a transport means which can be utilized to retrieve disabled vehicles under a variety of terrain and road conditions.

It is another object of the present invention to provide a transport vehicle which is fuel efficient in use.

It is a further object of the present invention to provide a transport vehicle which is highly stable due to a low center of gravity and balanced weight distribution.

Briefly, the preferred embodiment of the present invention is a tray trailer which can be pulled by an ordinary passenger automobile or pickup truck. The trailer includes a flat bed for loading an auto thereon, and a supporting framework. The invention further includes a fixed hitch and an A-frame which is pivotably attached to the supporting framework. The pivoting A frame allows tilting the rear end of the trailer downwards to facilitate loading. The tilting is accomplished by means of a self-contained electric winch which raises the front-end of the bed portion of the trailer about a column attached to the A frame. The trailer is supported by opposed sets of three low-profile wheels and tires which provide for a very low bed height, and thus eliminate the need for a severe tilt angle. The trailer is constructed of steel for durability and is designed to provide for crash safety. Aerodynamic features, such as specially designed fenders, air dams and positioning of the disabled vehicle, are provided for improved fuel economy.

A three wheel suspension system provides a high degree of stability by maximizing load equalization. The suspension system is designed to respond specifically to road conditions and to control trailer lean due to other loads, for example, high wind conditions. Each wheel may be preloaded to distribute weight depending on stability and handling requirements.

It is an advantage of the present invention that a disabled vehicle may be transported thereon without damaging the vehicle.

It is a further advantage of the present invention that the aerodynamic features provide for improved fuel economy and increased stability.

It is yet another advantage of the present invention that it is economical to manufacture and to operate.

It is a further advantage of the present invention that it may be towed behind an ordinary pickup truck, thus providing a more cost-effective means of operation through the use of specialized equipment.

It is a further advantage of the present invention that the trailer includes mechanical design features making it simple and safe to operate.

It is still another advantage of the present invention that it may be expanded to haul extra-wide vehicles.

It is a further advantage of the present invention that the tilting and loading may be remotely controlled.

It is yet another advantage that the trailer may be low to the ground, thus facilitating loading and unloading.

It is another object of the present invention that it may be easily adapted to haul two vehicles or one very long vehicle.

These and other objects and advantages of the present invention will no doubt become clear to one skilled in the art upon reading the following detailed description of the preferred embodiment which is illustrated in the several drawing figures.

IN THE DRAWINGS

FIG. 1 is a perspective view of an embodiment of the trailer of the present invention, showing the bed in the down position;

FIG. 1a is a perspective view of the trailer of FIG. 1 with the bed in the tilted position;

FIG. 2 is a perspective view of the suspension system of the trailer of FIG. 1;

FIG. 3 is a perspective view showing details of the lifting mechanism;

FIG. 3a is a cut-away view, taken along line 3a—3a of FIG. 3 showing details of the housing mechanism;

FIG. 4 is a perspective view taken from beneath the present invention showing details of the tray framework;

FIG. 7 is a perspective view illustrating the light bar of FIG. 5; and

FIG. 8 is a top plan view illustrating a second alternative embodiment.

DETAILED DESCRIPTION OF THE PREFERRED EMBODIMENT

Figure 6:
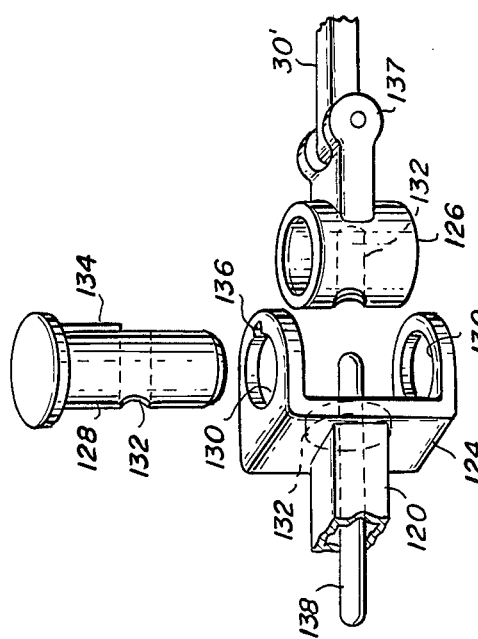
FIG. 6 is a detail illustration of the coupling mechanism of the embodiment of FIG. 5.

FIG. 1 illustrates a trailer of the present invention and referred to by the general reference character 10. The trailer 10 includes a flat loading bed or tray 11 with a reinforcing perimeter framework 12. The bed 11 includes a rear U-shaped cutout 13, approximately three feet wide by three feet long, and designed for operator entry before, during and/or after loading to facilitate service and hook-up of the automobile to be towed. On both sides of cutout 13, an underside 15 is tapered at an angle of approximately fifteen degrees to provide for greater ground contact area of bed 11 when it is in the tilted position. This prevents undue strain on the rear portion of bed 11 during loading and unloading of the disabled vehicle and improves ground clearance when driving up steep driveways.

The bed 11 rides on two opposing sets of three wheels and tires 16. Each set includes a rear wheel 16a, a middle wheel 16b, and a forward wheel 16c. The tires are selected to be of a size to provide a low trailer profile. This in turn allows the trailer to be operated without a large angle of tilt during loading and unloading of the disabled vehicle, and allows for vehicle retrieval from underground parking garages. The wheels 16 are provided with a suspension system to ensure a smooth ride and to minimize damage to the disabled vehicle due to "float." The suspension system is shown in FIG. 2 and includes a horizontal member 17 attached at one end to an axle 18a joined to rear wheel 16a. The member 17 is atached at its other end to an axle 18b joined to middle wheel 16b. Secured to the middle of member 17 is one end of a curved member 19, which is secured at its other end to a remaining axle 18c joined to front wheel 16c. Both members 17 and 19 are pivotably mounted at each attachment point. Member 19 is further pivotally mounted at a point approximately two-thirds of the way from the front, to the frame 12 of the trailer 10. The axles 18a, 18b, and 18c are thus mounted to allow for travel about the trailer's vertical axis.

Accordingly, when passing over a bump, each wheel will individually ride over the bump, then will return to its original position. Members 17 and 19 function to distribute the load applied to an individual wheel to the other wheels of the set. For example, as middle wheel 16b rides over a bump, the wheel is forced upward. The upward force on wheel 16b is transmitted as a downward force via horizontal member 17 to rear wheel 16a. Similarly the upward force is transmitted as a downward force via curved member 19 to the front wheel 16c. This distribution of force dampens shocks and greatly cushions the ride of the trailer 10, as well as providing for more even tire wear. To prevent undue yaw movement of members 17 and 19, a pair of lateral support struts 20a and 20b are attached to the members 17 and 19 and to the frame 12. The struts 20a and 20b are secured to members 17 and 19, respectively, and extend laterally inwards towards the frame 12 in a lopsided V. The apex of the V is laterally aligned with the attachment point of member 19 to member 17, hence strut 20a is shorter than strut 20b. At their apex, the struts 20a and 20b are pivotally joined together. Strut 20b is further pivotally joined to the frame 12 at a point laterally aligned with the attachment point of the member 19 to the frame 12. The struts 20a and 20b function to hold the wheels 16 in line with each other to ensure the trailer 10 "tracks" correctly. Although described as separate pieces, the struts 20a and 20b may be unitary with the members 17 and 19, respectively. Variations in the amount of force transmitted by each wheel may be obtained by adjusting the length members 17 and 19, and by adjusting the length ratio which is dependent the point of attachment of member 19 to member 17.

A pair of fenders 21 are provided to cover the wheels 16. Fenders 21 utilize air flow design to improve traction and to improve wet weather visibility by preventing excessive spray from the tires, and include an angled front piece 22, terminating in a front aperture 23. Angled front piece 22 is preferably inclined between eleven and thirteen degrees for optimum performance. This angle ensures laminar airflow to reduce drag and lift exerted by the air. At the rear of fenders 21 is a rear aperture 24. Rear aperture 24 is larger in size than front aperture 23. Immediately below rear aperture 24, immediately behind the rear-most wheel 16c, and extending continuously transversely underneath bed 11 is a rear air dam 25. Rear air dam 25 is a four inch beam extending the full width of the trailer and immediately behind the rear wheels. An air dam 26, similar to air dam 25, runs longitudinally the full width of the trailer, just in front of the forwardmost tire 16a. The air dams 25 and 26 aid to control air around the bottom of the tray and through the apertures 23 and 24, as illustrated in FIG. 1. Since rear aperture 24 is larger than front aperture 23 the airflow velocity underneath fenders 21 is increased. This creates a decrease in pressure under fenders 21 and thus results in a slight downward force which improves stability. Additionally, the vacuum created retards spray thrown out by the trailer's tires when travelling on wet pavement. Visibility is therefore markedly improved, making for safer maneuvering for both the trailer operator and surrounding traffic.

Attached to perimeter framework 12 immediately in front of air dam 26 is a pair of brackets 27. Pivotably mounted on brackets 27 are a pair of V-struts 29a and 29b which extend forward at an angle and are joined at their apex underneath to a neck 30. V-struts 29a and 29b together with neck 30 comprise an A-frame structure and provide the means by which the bed 11 is connected to a tow vehicle. The V-arrangement of the towing struts provides lateral stability by providing an inward force component as well as a longitudinal force component. Thus, should a force be exerted against the trailer tending to laterally displace it, the V-struts 29a and 29b will exert a counter force tending to bring the trailer back. V-struts 29a and 29b are formed of mild steel and designed to collapse first under impact and to thus prevent or minimize damage to the more expensive bed and framework components of the trailer. This feature also serves to absorb longitudinal shock and thus, minimizes the possibility of a carried vehicle breaking loose and impacting the tractor vehicle. Additionally, in case of a severe jackknifing accident, the V-struts 29a and 29b are adapted to break off just behind the neck 30, and thus to prevent loss of control of the towing vehicle. Neck 30 is a length of square steel tubing about fifteen inches long. The front end of neck 30 terminates in a locking hitch assembly 31 designed to engage an ordinary towing ball. At the opposite end of neck 30 is a square bracket 32 which is adapted for pivotably mounting a square column 34 in a substantially vertical orientation. As illustrated in FIG. 3, the base of the column 34 is secured to bracket 32 to project upwardly, and is secured by attachment points on either side of bracket 32 and column 34 to allow column 34 to pivot backwards slightly.

At the top of column 34 is a perpendicular cross member 35 supporting a pulley 36. On a forward facing surface of square column 34, and spaced evenly approximately ten inches apart are a plurality of oblong apertures 37. Slidably mounted over column 34 is a cross member 39 which is perpendicular to the column 34, and is parallel with cross member 35. Mounted on the front of cross member 39 is a housing 41 extending outward slightly from column 34 and containing an arm 42. Arm 42 is pivotably mounted within housing 41 and projects outwardly away from the housing and along the trailer's axis of motion A as shown in FIG. 3a. The projecting end of arm 42 is connected to one end of a cable 43. Further included within housing 41 is a pin 44 and a spring 45. Pin 44 is cylindrical and adapted to slidably fit within an aperture 37 of the column 34. Pin 44 is biased towards the column 34 by means of the spring 45. Arm 42 extends downward within housing 41 and contacts a tab 46 projecting from the top of pin 44. Lift cable 43 is attached to arm 42 at a point forward of arm 42's mounting point within housing 41. Thus when force is applied to arm 42 via cable 43, the lower end of arm 42 pivots forward, contacting tab 46 and urging pin 44 out of contact with the apertures 37 of column 43. With no tension supplied to arm 42, spring 45 urges the pin 44 into contact with the apertures 37. This feature serves as a "deadman" in the event of a cable failure. In such a case, the release of tension on arm 42 would allow spring 45 to urge the pin 44 into contact with one of the apertures 37 of the column 34. This prevents the bed from slamming down, avoiding damage to both the vehicle and the operator. The pin 44 further serves to lock the bed when in the fully lowered position and thus will prevent it from inadvertently tilting upward even if an uneven or unbalanced load is applied to the bed. As illustrated in FIG. 1 cable 43 passes from arm 42 over pulley 36 and is connected to a lift winch 47. Winch 47 is secured to the back of cross member 39 and, is an electric winch of one and one-half horsepower, which provides the motive force by which the apparatus is tilted.

At each lateral end of cross member 39 is a sleeve 48. Sleeves 48 are U-shaped and project downward with the open portions of the sleeves aligned along the trailer's axis of motion A. Pivotably attached to sleeves 48 are brackets 49, which in turn are secured to the tops of longitudinal beams 50a and 50b. Intermediate the brackets 49 and the longitudinal beams 50a and 50b are rubber bushings 51 which help to absorb shock and vibration transmitted by the A frame. Beams 50a and 50b are parallel to each other and to the axis of motion of the trailer, and are spaced approximately one foot apart. These beams are connected to the framework 12 and to bed 11 as shown in FIGS. 1 and 4, and are the means by which force is communicated with it to lift the bed. Lifting of the bed is accomplished by engaging the lift winch 47. As lift winch 47 takes up cable 43, upward force is exerted via pulley 36 to arm 42 of the housing 41. Housing 41, and with it cross bar 39 and longitudinal members 50a and 50b slide up column 34, pivoting about brackets 27. The bed is lifted in this manner until the tip of tapered underside 15 of the bed 11 contacts the ground, and the disabled vehicle can be driven or loaded on. The bed is illustrated in its tilted position in FIG. 1a. Various safety features are present in the lifting mechanism. The first of these is that the bed is balanced to drop by gravity. Thus, if the disabled vehicle is not properly loaded, for example, if the load is not far enough forward, the bed will remain tilted and thus alert the operator to the improper loading. Proper loading is important as improper weight distribution can result in poor or unsafe handling characteristics and may lead to damage to the trailer apparatus during transport. Additionally, many state motor vehicle regulations, such as California, set legal requirements for weight distribution of such trailers. This mechanism also prevents the bed from rising when winching a vehicle out of mud, or from an uneven surface.

The electric lifting mechanism also poses economic advantages over the hydraulic ones used in the prior art. The electrical system is self-contained and does not need to be coupled to the truck, thus it may be operated independently. The location of the hydraulics in the prior art is underneath the lifting bed. Because of the limited space available, little leverage is obtainable. This necessitates using high pressure systems which undergo very high stresses. Further, hydraulics are more complicated, heavier, and result in more power loss due to transmission inefficiency. The electrical system is self-contained, cheaper, lighter, simpler, and easier to service.

Further attached to longitudinal tubes 50a and 50b, just aft of lift winch 47 is a load winch 52. Load winch 52 is mounted between the longitudinal tubes 50a and 50b. Attached to winch 52 is a load cable 54 for winching a disabled vehicle on board. Both winch 47 and winch 52 are connected to an electrical harness cable 56. Cable 56 terminates in a control means 57 containing switches for winches 47 and 52. The length of cable 56 is sufficient to allow winch operation from the rear of the trailer. This provides a further safety advantage in that the tow operator can winch in a vehicle while remaining with the vehicle to steer or to apply the brakes in case of a cable failure. Attached to longitudinal tubes 50a and 50b just aft of winch 52 are a pair of brackets 58. Brackets 58 are rearward facing and angled outward at an angle of twelve degrees. Rotatably mounted on each bracket 58 is a hand operated winch assembly 59 having a ratchet and pawl mechanism. Attached to winch assembly 59 is a flexible strap 61, terminating in a J-hook 62. Straps 61 are composed of nylon and together with hook 62 are designed to secure a vehicle to the trailer. The J-hooks 62 are designed with a tip which extends parallel to the shank and is sufficiently long to ensure that the hooks will remain attached to the vehicle even when the straps 61 are slack. Brackets 58 are positioned low on the bed to maximize the horizontal force component of the winches 59, and are angled outward to provide for an inward force component, thus ensuring centering of the load.

Approximately one and one-half feet behind winch 52 and secured between longitudinal tubes 50 is an integral tool box, consisting of a recessed tray 67 and a hinged cover 68. Cover 68 is held up by a pair of compressed gas cylinders 69 as shown in FIG. 1a. These cylinders are designed to urge the lid completely open and to keep it open after it has been manually opened to a preset degree. This feature serves to protect the operator from the lid inadvertently slamming down. Cover 68 is secured to tray 67 by two hinges, and can be easily slid on and off by unsecuring the pins securing the upper ends of the hydraulic cylinders to the cover 68 and laterally sliding the cover off. This feature allows easy replacement of the cover in case of damage. The forward portion of each tube 50a and 50b, comprising approximately the first six feet is sealed to provide a pair of tanks 70 for the storage of compressed air. A tank 70 is illustrated in phantom in FIG. 3. Tubes 50a and 50b thus serve both as structural support and as utility storage components. The leading edges of tubes 50a and 50b are cut at an angle of approximately forty-five degrees. This further contributes to the crash engineering of the trailer 10. In any collision that would tend to force the trailer 10 into the tractor vehicle, the angled leading edges of tubes 50a and 50b will pierce the body of the tractor vehicle rather than slide under it. This serves to stabilize the trailer during such a collision, and thus minimizes damage to any vehicle loaded thereon. Connected to each tank 70 is a coupling 71, which is adapted to couple an air hose to access the air supply. The supply of compressed air is useful to supply air for tires and to power various compressed air equipment, such as air wrenches. Immediately behind the tool box, as shown in FIG. 4, a battery 73 is secured between longitudinal tubes 50a and 50b. This central location of battery 73 minimizes the possibility of collision damage. Battery 73 is electrically coupled to control means 57 and provides the electric power for winches 47 and 52.

Also secured to longitudinal tubes 50a and 50b are a pair of "cheater bars" 74. These bars are cylindrical in construction and extend laterally outward about two and one-half feet on each side of the longitudinal tubes 50a and 50b. The bars are attached to the longitudinal tubes 50a and 50b at a point approximately one and one-half feet in front of bed 11. Each cheater bar 74 is capped by a protective foam pad 75 and reinforced by a strut 76 and a rod 77. The struts 76 extend laterally outward from beneath longitudinal tubes 50 and angle up to join cheater bars 74. Reinforcing rods 77 extend longitudinally from the front of framework 12, as shown in FIG. 4, and are welded or joined to the strut 76 near its point of intersection with the cheater bar 74. A wheel well 78, is formed by the space between bed 11 and cheater bars 74. This wheel well 78 allows recessing of the front wheels of a disabled vehicle which lowers the vehicle's nose to improve aerodynamics, and further provides for proper positioning of very long vehicles.

At the rear of bed 11 are a pair of winch assemblies 80. These, like winch assemblies 59, are hand operated having a ratchet and pawl mechanism, and are angled outward at an angle of approximately twelve degrees. Secured to each winch assembly 80 is a flexible strap 82 which terminates in a J-hook 83. These hooks are designed to secure the rear end of an automobile to the trailer. When not in use, J-hooks 83 are hooked into a pair of slots 84 of bed 11.

Secured to each longitudinal member 50a and 50b, approximately one foot behind front perimeter member 12a, is a crush piece 85. These are small brackets of mild steel about two inches long, and welded to the underside of the members 50a and 50b, and to the top of the front air dam 26, as illustrated in FIG. 4. These pieces are designed to collapse under a predetermined load. The effect of collapsing the crush pieces 85 is to cause the bed 11 to tilt forward slightly. This alerts the operator to the overloaded condition. The crush pieces 85, by collapsing before the bed or frame, thus serve to signal the operator to correct the condition, before serious damage results.

Additional structural support for the bed 11 is provided by a pair of longitudinal runners 90, and by a plurality of support ribs 92 shown in FIGS. 1 and 4. The runners 90 are steel I-beam members and extend the length of the bed 11, being attached at the front and back to lateral perimeter members 12. Ribs 92 project laterally from each side of the runners 90 and cover approximately eighty percent of the width of bed 11. The ribs 92 are staggered such that ribs 92 projecting from each runner 90 are not colinear. This staggered spacing of the ribs 92 prevents distortion of the bed under load and relieves stress by distributing the torsional loads.

At the rear of bed 11, and running laterally through it is a square aperture 94 which is adapted to secure an additional section to the bed 11. FIG. 1a illustrates one example of an additional section; an approach plate 95. Approach plate 95 is rectangular, and at each front side of the plate is a pin 96 which can be slidably inserted into the aperture 94. The pins 96 may be spring loaded to ensure a secure fit within the aperture 94. The tray is positioned such than when the trailer is tilted, the tray lies flat on the ground. This allows a car fitted with even a non-legal or excessively low front spoiler to be driven or loaded onto the bed 11 without damaging the spoiler, due to the decreased approach angle. Additional sections may be fitted to the bed 11 in the same manner as the approach plates 95. For example, a section may be inserted to fill up the cutout 13, or extra sections may be placed on either side of the bed 11.

Secured to the underside of V-member 29a, about one-third of the way from its apex, is a kickstand 97 which is a motorcycle-type kickstand and allows for self hitching and unhitching of the trailer apparatus 10 to the towing vehicle. Unhitching is accomplished by first raising the bed 11, then lowering kickstand 97 and lowering bed 11. As bed 11 comes down, the weight of the trailer is transferred through V-members 29a and 29b to the highest point of resistance. Kickstand 97 is located at or near the balance point of V-member 29a and becomes the highest point of resistance. Weight is thus taken off hitch 31 and the trailer is freed from the towing vehicle. To hook up tailer 10, the process is simply reversed.

The preferred embodiment 10 is utilized by backing the trailer up to a disabled vehicle. Because of the low positioning of the winch 52, cable 54 and bed 11, greater force may be employed in the desired direction, that is horizontally, and less force is wasted in the upward direction. The tow operator can pick up disabled vehicles at an angle of almost 80° to the trailer. Thus, the trailer does not have to be backed up directly on line with the disabled vehicle. The trailer may be tilted either before or after it is backed up to the disabled vehicle depending upon the requirements dictated by the terrain. The towing cable 54 is then hooked up to the disabled vehicle and it is winched on board by the operator. Remote control 57 allows the operator to load the disabled vehicle from either side of the trailer 10, from inside the tractor vehicle, or even from inside the disabled vehicle. Thus, the operator can place himself in the position he determines is necessary to ensure safe loading. The appropriate load position is determined from the vehicle's length and it is positioned accordingly to balance the trailer. If desired, or necessary due to vehicle's length or configuration, the vehicle may be placed fully forward so that the front wheels rest in the wheel well 78 formed between the cheater bars 74 and the front of the bed 11. This serves two purposes. First, it ensures balancing of large loads. Second, it tilts the front of the disabled vehicle down slightly, exposing more of its "wetted" surface to the wind, lowering wind resistance. Should the auto be one fitted with a front spoiler, recessing the wheels in the wheel well 78 allows additional clearance for the spoiler, thereby preventing damage to the spoiler caused by bounce or float during transport. Once the car is in position, the front securing straps 61 are attached to the outboard suspension components of the car. The tray 11 is then lowered to the level position and the rear securing straps 82 are attached. The securing straps 61 and 82 are attached to the outboard suspension components of the disabled vehicle, so that it may be further isolated from road shocks by its own suspension system, in addition to the suspension system of the trailer 10. The rear cutout 13 facilitates this operation. Front and rear straps 61 and 82 are winched tight thereby securing and centering the car, and the load cable 54 is slackened. All four securing straps 61 and 82 are positioned at an outward angle relative to the trailer's 10 longitudinal axis A. This results in an inward lateral force component being exerted on the car as the straps 61 and 82 are tightened and thereby ensures centering for proper balance. Once the car is secure and the bed leveled, the tow vehicle is simply driven off with the trailer 10 and towed vehicle.

Figure 5:
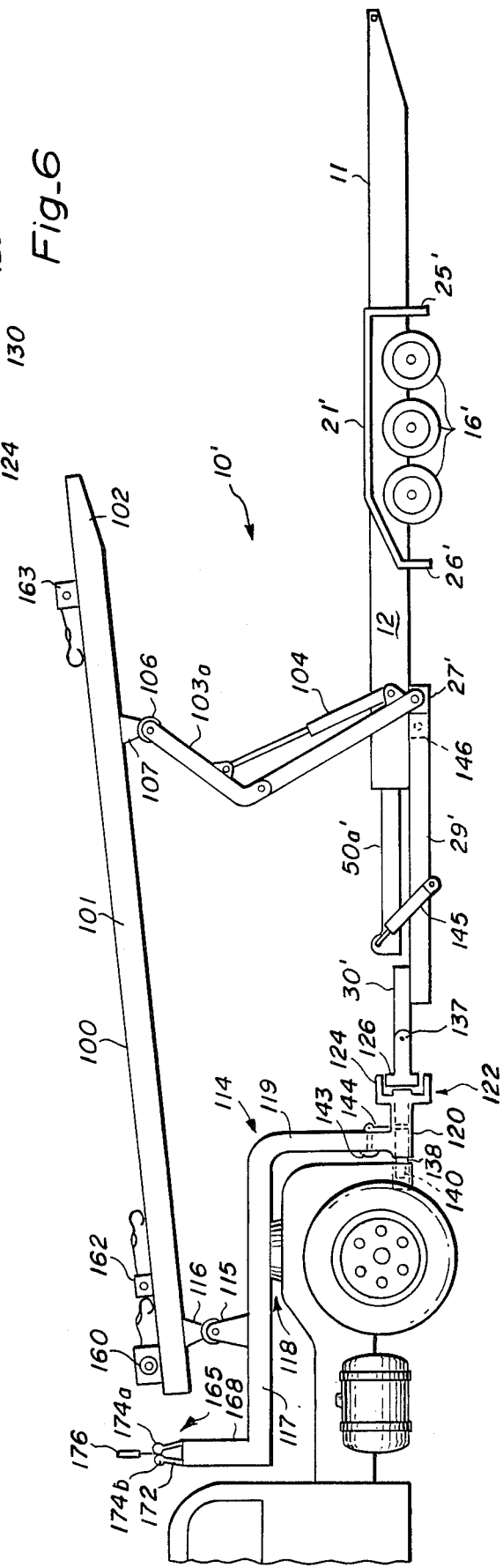
FIG. 5 is a side view of a first alternative embodiment of the present invention.

FIG. 5 illustrates an alternative embodiment, designated by the general reference character 10', which can carry two automobiles, or one very long vehicle, such as an RV. The trailer 10' includes substantially all of the elements of the trailer 10. Those elements common to the trailer 10 carry the same reference numeral distinguished by a prime designation. Trailer 10 further includes an additional bed 100 mounted atop an elevated support assembly 10. Bed 100 is substantially the same as bed 11' being generally rectangular in shape, and is supported by a perimeter framework 101. At the rear of bed 100 is a tapered underside 102. Tapered underside 102 serves a function analagous to tapered underside 15 of bed 11, that is, it provides greater surface area for contact with the top of bed 11', thus relieving stress on both bed 100 and bed 11' when in the tilted position. A support assembly 103 includes an upper U-shaped unitary segment 103a which extends across the lateral width of the beds 11' and 100, and a pair of supporting segments 103b which pivotably connect to the U-segment 103a. Upper U-shaped segment 103a comprises a horizontal intermediate portion, bending at each end ninty degrees downward to form at each end a vertical section, each vertical section further bending ninty degrees into a dogleg which is perpendicular to both the horizontal and vertical portions. These dogleg sections are pivotably attached to the supporting segments 103b. Attached to the segments 103b and to the U-segment 103a are a pair of hydraulic cylinders 104. The cylinders are adapted to exert force on the support assembly 103 to elevate the bed 100. The dogleg sections are necessary to ensure that force exerted by the hydraulic cylinders acts in the correct direction, and allow the bed 100 to be fully lowered.

The supporting segments 103b are attached at their lower ends to brackets 27' of bed 11'. At the top of U-shaped segment 103a, and centrally located about its lateral dimension is a joint 106. Joint 106 is rotatable about two axes, the first being about the lateral or pitch axis and the second being the vertical or yaw axis. The bed 100 is attached to joint 106 by a pair of support struts 107. Struts 107 are mounted on joint 106 to allow for rotational movement about the vertical axis. The struts 107 extend upward in a V with the apex being mounted about the joint 106, and the bed 100 fixedly mounted atop the struts 107.

At its forward end, the bed 100 is pivotably attached to a tubular framework 114 by means of a joint 115 which is mounted on the forward upper surface of the framework 114 and which is identical in structure and function to the joint 106. The bed 100 is attached to the joint 115 by a pair of support struts 116, which are mounted on joint 115 to allow for rotational movement about the vertical axis, and which extend upward in a V and are secured to the bed 100. The framework 114 includes an anterior horizontal section 117 formed for attaching with a "fifth wheel" attachment plate of a truck tractor chassis, and defining a pivot point 118 about which the framework 114 may revolve. The framewok 114 curves downward, forming a vertical section 119 just aft of the truck chassis. A posterior horizontal section 120 is attached to the section 119 and is adapted for coupling with the bed 11'. The bed 11' is pivotably attached to an A-frame comprising a pair of V-members 29', joined at their apex to a neck 30'. The neck 30' is coupled to the horizontal section 120 about a pivoting joint 122. As shown in FIG. 6, joint 122 comprises a C-shaped coupling 124 attached to the horizontal section 120, and a hollow cylinder 126 attached to the neck 30' and adapted to slidably fit within the coupling 124. The cylinder 126 is secured within the coupling 124 by a locking pin 128 which fits through a pair of apertures 130 in the top and bottom of the C coupling 124, locking the hollow cylinder 126 therein. The C coupling 124, pin 128 and cylinder 126 each further include a longitudinal aperture 132, which is colinear with and extends through the horizontal section 120. To ensure that the pin 128 is aligned within the coupling 124 so that the aperture 132 is not blocked, the pin 128 includes a key 134 and the coupling 124 includes a keyway 136 for receiving the key 134. Intermediate the cylinder 126 and the neck 30' is a pivot joint 137, which allows for pitch motion of the A-frame of the bed 11'. The two pivot points 118 and 122 may be alternatively locked so that the trailer 10' is freed to pivot about only one pivot point. This is accomplished by a cylindrical locking pin 138 which is slidably inserted within aperture 132. Formed into the truck chassis and colinear with the horizontal segment 120 and the longitudinal aperture 132 about the trailer 10's axis of motion A' is an aperture 140 for receiving the locking pin 138. This is illustrated in FIG. 5. When the pin 138 is urged forward into aperture 140, it locks the framework 114 to the truck chassis and thus prevents the framework from revolving about pivot point 118. In the forward position, however, the pin 138 is disengaged with the rear pivot 122, and the trailer 10' is freed to revolve thereabout. Conversely, the pin 138 may be urged backwards, locking the cylinder 126 to the C-coupling 124 and simultaneously freeing the pivot point 118. The pin 138 is chosen to be of a length approximately equal to the distance between the aperture 140 and the coupling 124. The pin 138 is further equipped with tapered ends which aid in guiding the pin into the aperture 140, and which help to ensure that exactly one pivot point is locked. Should the pin 138 not be fully inserted into the aperture 140 or coupling 124 such that revolving motion is prevented, any revolving motion of the trailer 10' will cause the pin to be urged in the opposite direction, thereby locking the opposite pivot point. The pin 138 is remotely controlled and urged forwards or backwards by means of a vacuum diaphragm 143 coupled to the pin by a shift fork 144. An interlock may be employed to disable the forward motion unless the horizontal section 120 is aligned with the aperture 140.

The two pivot points 118 and 122 allow the operator to choose the configuration most suited to the existing road conditions. For example, narrow roads may dictate choosing the truck-trailer configuration whereby the forward pivot point 118 is locked. This allows the truck tractor to turn more sharply because the pivot point is aft of the tractor's rear wheels. On freeways, increased stability can be obtained by locking the rear pivot 122, putting the apparatus in its tractor-trailer configuration whereby the pivot point is over the truck tractor's rear wheels.

Tilting of the bed 11' is accomplished by a pair of hydraulic cylinders 145. As shown in FIG. 5 the cylinders 145 are pivotably attached at one end to the V members 29'. The V members 29' are each in turn each pivotably attached to the bed 11' about a pair of brackets 146, which are attached to the underside of bed 11' and just inside of bracket 27'. Rigidly attached to the bed 11' are a pair of longitudinal tubular supoprt memebers (only 50a' is shown). Each hydraulic cylinder 145 is connected at its other end to a tube, and exerts force on it to tilt the bed 11' about the brackets 146. Operation of the hydraulic cylinders 145 as well as the hydraulic cylinders 104 is as known in the prior art.

Bed 100 is fitted with an electric winch and cable means 160 secured to the forward end of the bed. This winch and cable has a pulling capacity preferably on the order of five tons. To secure a disabled vehicle, a forward pair of winch assemblies 162, and an aft pair of winch assemblies 163 are provided. The composition, structure and relative positioning of these winch assemblies are identical to those described in the preferred embodiment.

Attached to the top forward end of the framework 114 is a light bar assembly 165 as shown in FIGS. 5 and 7. Light bar assembly 165 extends across the width of and above the level of the tractor cab to provide illumination for the trailer apparatus at night. Light bar assembly 165 is collapsable to improve aerodynamics and to ensure that adequate clearance will be provided e.g. in underground parking garages. The assembly 165 consists of a base bar 166 which may be directly attached to the framework 114, or which may be mounted on vertical supports 167, depending on the cab and chassis height. The light bar assembly 165 may also be mounted independently of the trailer 10'. For example, as shown in FIG. 7, the assembly 165 may be directly mounted to a bed 168 of a pickup truck which is the tractor vehicle for the preferred embodiment. Rigidly attached to each end of the base bar is a vertical member 169. The members 169, like the base bar 166, are constructed of one-quarter inch steel tubing, and extend to the top of the tractor cab. The members are inclined laterally inwards at an angle of approximately ten degrees to parallel the cab sides. The vertical members 169 serve to support a light bar and aid in crash protection by shielding the cab from a rear impact and help to provide rollover protection. The light bar is mounted between the vertical members 169 and includes a pair of pivot arms 172, pivotably mounted on the vertical members 169. Between the pivot arms 172 is a pair of tubes 174a and 174b. The tubes 174a and 174b are aligned horizontally, parallel to each other and spaced approximately three inches apart. The tubes 174 thus provide a level surface for the attachment of a plurality of lights 176 which are attached to brackets 177 intermediate the tubes 174a and 174b. Interconnecting each tube 174a and 174b with the pivot arms 172 are a pair of cylinders 178. Cylinders 178 are slightly smaller in size than the tubes 174 and are adapted to slidably fit therein in a telescoping fashion. Within each end of tubes 174a and 174b is a spring 179 to bias the cylinders 178 outwards. The pivot arms 172 are angled approximately ten degrees from the horizontal, so that the pivot arms travel in an arc as the horizontal tubes 174a and 174b move up and down. This causes the cylinders 178 to move in and out of tubes 174a and 174b. Attached to each pivot arm 172 and to the base bar 166 is a gas cylinder 180. These cylinders exert an upward force on the pivot arms 172 to maintain the telescoping tubes 174a and 174b in the elevated position.

The tubes 174a and 174b are urged up or down by a pair of arms 181 attached to a cylinder 182 which is attached to the base bar 166. The cylinder 182 is rotatably mounted and includes a pair of fixedly mounted tabs 184 which are linked to the arms 181. A handle 186 on the cylinder 182 allows the operator to rotate it. The rotary motion of the cylinder 182 thus urges the arms 181, and with them, the tubes 174a and 174b, up or down. Tension in the springs 179 and in the gas cylinders 180 is balanced with the frictional resistance to rotation of cylinder 182 so that the tubes 174a and 174b will remain in the desired position without the need for any locking mechanism. Mounted atop the tubes 174a and 174b are the floodlamps 176 for illuminating the work area, but other lights can be utilized e.g. a rotating warning beacon, or some combination of these.

If the apparatus 10' is to be used to carry two vehicles, the lower bed 11 is tilted downward as described in the preferred embodiment. The upper bed 100 is also tilted downward by collapsing supporting framework 103 and allowing tapered underside 102 of bed 100 to rest atop bed 11. The disabled vehicle is then loaded onto bed 100 by means of the winch assembly 160. The vehicle is secured to the bed 100 by winch assemblies 162 and 163. The bed 100 is then tilted back to the elevated position, and a second vehicle is loaded onto bed 11 exactly as described in the preferred embodiment.

To carry an extra long vehicle, the bed 100 is simply tilted downward to contact the bed 11 and left in such position. The vehicle is then winched aboard using winch and cable means 160 and secured in the manner previously described.

A second alternative embodiment of the present invention is provided which may be laterally contracted to maneuver through narrow roads, and expanded to haul extra wide vehicles. The expansion mechanism is electrically operated which allows for rapid conversion from the normal width to the expanded width. This embodiment is illustrated in FIG. 8 and designated by the general reference character 10''. Those elements common to the trailer 10 carry the same reference numeral distinguished by a double prime designation. Trailer 10'' includes a bed 200 to which is attached two opposing sets of three wheels and tires 16''. Bed 200 is comprised of three sections: a fixed section 200a and movable sections 200b and 200c. Fixed section 200a is shaped like a capital letter "I" comprising a central longitudinal section aligned with the axis of motion, A'' of the trailer 10'', and a front and an aft lateral section.

Section 200a is constructed essentially the same as bed 11 of the preferred embodiment, that is, an I-beam framework supporting a flat metal bed. Attached to the underside of section 200a are a pair of brackets 27''. Pivotably mounted on each of these brackets is a V-member 29a'' and 29b'' as in the preferred embodiment. Also attached to the front of section 200a, in the same manner as in the preferred embodiment, are longitudinal members 50a'' and 50b''.

The middle longitudinal portion of section 200a comprises a hollow rectangle, open at each lateral side. Mounted within section 200a is a motor 205, a driveshaft 206, a first gearbox 208 and a second gearbox 210. First gearbox 208 is located near the front end of the hollow section 200a and second gearbox 210 is located near the rear end of the hollow section 200a. Gearboxes 208 and 210 each drive cylindrical ball screws 212, which extend laterally outward on either side of gearboxes 208 and 210. Front gearbox 208 contains a reduction gearing mechanism adapted for coupling to motor 205. The motor 205 is reversable and is mechanically coupled to front gearbox 208, which is coupled to rear gearbox 210 by driveshaft 206.

Gearboxes 208 and 210 drive the ball screws 212 at the same rate, and their mechanical coupling by driveshaft 206 ensures synchronous rotation of gears 212.

Slidably mounted within the hollow longitudinal portion of fixed section 200a are movable sections 200b and 200c. These are closed hollow rectangles, aligned with their longitudinal axes parallel with the trailer's 10'' longitudinal axis A''. Sections 200b and 200c are slightly smaller in size than the hollow longitudinal portion of section 200a and are adapted to slidably fit therein, in a telescoping fashion. Mating with helical screws 212 are threaded nuts 214. These are located on the inside longitudinal wall of each section 200b and 200c and are rigidly mounted such that when engaged with helical screws 212, rotation of the screws 212 is translated into linear movement of sections 200b and 200c. Rotation of ball screws 212 thus urges telescoping sections 200b and 200c inward or outward, depending on the direction of rotation of gears 212. In this manner the trailer 10'' may be expanded or contracted to suit the particular needs of a given situation. The amount of travel of sections 200a and 200d is approximately two feet, which, in the fully retracted position draws the wheels 16'' in flush with the outside lateral edges of fixed section 200a.

Although the present invention has been described in terms of the preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A transportable tray trailer apparatus for towing behind a tractor vehicle and adapted for transporting motor vehicles thereon comprising:

a tiltable tray portion including a first flat rectangular bed attached to a primeter framework, a securing means for securing and centering a vehicle about a vehicle loading portion of said bed, the tray further including a first and a second longitudinal member positioned parallel to each other and to an axis of motion of the trailer and rigidly attached to a front portion of said perimeter framework;

a wheel means attached to opposite lateral sides of said perimeter framework for movably supporting the tray portion at an elevated position above the ground;

a towbar means for attaching the tray to a tractor vehicle, the towbar means including a first and a second V-member pivotably attached to each front lateral side of said perimter framework and rigidly attached to a longitudinal neck member, said neck member having at an anterior terminal end a hitch formed for attachment to said tractor vehicle;

a winch means secured to said longitudinal members for loading a motor vehicle onto the tray;

a tilting means formed to the towbar means and to the tray and including a vertical column pivotably mounted to said neck member, said column including a plurality of spaced-apart apertures, a horizontal cross member secured to said first and second longitudinal members and slidably fitting over said column and including a lift means for lifting said first and second longitudinal members relative to said column and a locking means to secure said longitudinal members in a lifted position about said apertures; and said wheel means are partially enclosed by a fender means, said fender means including a front angled portion, an intermediate horizontal portion, and a rear vertical portion, said front and rear portions each including apertures, with said front aperture being smaller than said rear aperture resulting in a slight downward force on the trailer during transport, said slight downward force improving stability of said trailer during transport, said fender means further including a front air dam extend laterally underneath the tray and immediately in front of the wheel means, and a rear air dam extending laterally underneath the tray and behind the wheel means.

2. The trailer according to claim 1 wherein
said securing means includes an anterior pair of winches, each winch attached to a flexible strap terminating in a hook, said anterior winches being located near the anterior corners of said bed and positioned outwardly relative to the axis of motion of the trailer;
a posterior pair of winches each attached to a flexible strap terminating in a hook, said posterior winches being positioned outwardly at an angle relative to the axis of motion of the trailer; and
said anterior and posterior pairs of winches being adapted to exert a component of inward force on the vehicle whereby the vehicle is stably maintained in a central position on the bed.

3. The trailer according to claim 2 wherein
the tray includes a rear cutout to allow access to an underside of a vehicle loaded thereon, a tapered underside at the rear of the tray to increase ground contact area and to relieve stress on the tray when in the tilted position, and a lateral aperture formed through its posterior end; and
a pair of longitudinal reinforcing runners secured to the underside of said bed and laterally separated, said runners including a plurality of lateral ribs attached thereto and projecting alternatively to either side of said runners in a staggered fashion.

4. The trailer according to claim 1 wherein
said first and said second V-members are constructed of mild steel whereby in case of longitudinal impact said members will collapse first thereby preventing damage to the bed components; and
said first first and said second longitudinal members are each supported on said front air dam by a bracket formed of mild steel and adapted to collapse under a predetermined load whereby on overloading the front portion of the bed to a predetermined amount said brackets will collapse, thereby alerting the operator to the overloaded condition.

5. The trailer of claim 1 wherein
said first V-member includes a kickstand located on the underside of said V-member and near to the hitch assembly wherein said trailer may be independently supported to allow self-hitching and unhitching.

6. The trailer according to claim 1 and further including
first and second tubular members, located approximately two feet in front of said bed and attached to and projecting laterally from said first and second longitudinal members, whereby a wheel well is formed between the bed and tubular members.

7. The trailer according to claim 1 wherein
said first and second longitudinal members comprise hollow tubes with the forward portion thereof sealed to provide storage tanks for the storage of compressed air.

8. The trailer according to claim 3 wherein
said bed includes a central hollow longitudinal section intermediate a front and a rear lateral section, said lateral sections including a reinforcing perimeter framework, and a pair of longitudinal bed sections arrayed between said lateral sections and slidably engaged with said center longitudinal section in a telescoping fashion, said bed further including means for extending said telescoping sections whereby said bed may be expanded or contracted in width.

9. The trailer according to claim 8 wherein
said means for extending said telescoping sections includes
an electric drive motor centrally located within said hollow longitudinal section, a first gearbox coupled to said motor and having a pair of helical drive screws projecting laterally outward on each side of said gearbox, said first gearbox being mechanically coupled to a second gearbox, said second gearbox being identical with said first gearbox and including a pair of laterally projecting helical drive screws;
a pair of ball gears mounted on each telescoping bed section and adapted for mating with each of said helical drive screws; and
guide means for guiding said telescoping sections into and out of said hollow longitudinal section.

10. The trailer according to claim 8 wherein
said means for extending said telescoping sections includes
hydraulic cylinder means connected to each of said telescoping sections and to said hollow longitudinal section, said hydraulic cylinder means being adapted to urge said telescoping sections inward and outward; and
guide means for guiding said telescoping sections into and out of said hollow longitudinal section.

11. The trailer according to claim 3 and further including
a pair of approach plates for fitting to said posterior end of the tray, each plate being generally rectangular in shape and including a pin means for fitting into said lateral aperture whereby said plates may be pivotably secured to the tray.

12. The trailer according to claim 1 wherein
the wheels means includes two opposed sets of three wheels each.

13. A transportable tray trailer apparatus for towing behind a tractor vehicle and adapted for transporting motor vehicles thereon comprising:
a tiltable tray portion including a first flat rectangular bed attached to a perimeter framework, a securing means for securing and centering a vehicle about a vehicle loading portion of said bed, the tray further including a first and a second longitudinal member positioned parallel to each other and on either side of a vehicle centerline and rigidly attached to a front portion of said perimeter framework;
a wheel means attached to opposite lateral sides of said perimeter framework for movably supporting the tray at an elevated position;
a tow bar means for attaching the tray to a tractor vehicle, the towbar means including a first and a second V-member pivotably attached to each front lateral side of said perimeter framework and rigidly attached to a longitudinal neck member, said neck member having at an anterior terminal end a hitch formed for attachment to said tractor vehicle;
a winch means secured to said longitudinal members for loading a motor vehicle onto the tray;
a tilting means formed to the towbar means and to the tray and including a vertical column pivotably mounted to said neck member, a horizontal crossmember secured to said first and second longitudinal members and slidably fitting over said column and including a lift means for lifting said first and second longitudinal members relative to said column and a locking means to secure said longitudinal members in a lifted position; and a collapsible light bar assembly for mounting about said tractor vehicle and illuminating said trailer, the assembly including a base bar, a pair of support members extending generally upwards from each lateral end of said base bar, a pivot arm, attached to each of said support members and extending generally horizontally inwards, a pair of telescoping tubes, pivotably attached to and between said pivot arms, said tubes extending horizontally and including at least one lamp mounted thereon, said tubes further including a biasing means to urge said tubes to an extended state, the assembly further including a biasing means attached to each of said pivot arms to bias said pivot arms upwardly, and a cylinder, rotatably mounted on said base bar and including a pair of arms projecting from a surface of said cylinder, each arm supporting a rod attached to said telescoping tubes, said cylinder further including a means for rotating the cylinder whereby said telescoping tubes are urged upwardly or downwardly about said pivot arms.

14. A transportable tray trailer apparatus for towing behind a tractor vehicle and adapted for transporting motor vehicles thereon comprising;

a tiltable tray portion including a flat rectangular bed attached to a perimeter framework, the tray including a first and second longitudinal member on either side of and parallel with a vehicle centerline and rigidly attached to a front of said perimeter framework, the tray further including a pair of longitudinal reinforcing runners under said bed and a plurality of reinforcing ribs attached to said runners, a rear cutout to facilitate operator entry, a tapered underside and a securing means comprising an anterior and a posterior pair of winches secured to said bed at an inward-facing angle at a front and a back portion thereof, each winch including a flexible strap terminating in a hook, said securing means adapted for securing and centering a transported vehicle about a vehicle loading portion of the tray;

a wheel means attached to opposite lateral sides of said perimeter framework for movably supporting the tray portion at an elevated position above the ground, the wheel means including a fender means having a front angled portion positioned in front of the wheel means, and including a slot formed therein, an intermediate horizontal portion positioned above the wheel means, and a rear vertical portion positioned behind the wheel means, and including a slot formed therein, said front portion slot being smaller than said rear portion slot, said fender means further including a front and a rear air dam extending laterally underneath the tray and immediately in front of and behind the wheel means respectively;

a tow bar means including a first and a second V-member pivotably attached to each lateral side of the tray and rigidly attached to a longitudinal neck member about the vehicle centerline, said neck member terminating in a hitch means at an anterior end thereof;

a tilting means formed to the towbar means and to the tray comprising a substantially vertically-oriented column pivotably mounted to said neck member, said column including a plurality of spaced-apart apertures about a front face thereof, the column also including a vertically-oriented pulley atop the column, a horizontal cross member, pivotably secured to said first and said second longitudinal members and slidably fitting over said column and including a cable attachment means comprising a bent arm member pivotably mounted within a housing and having a first terminal end projecting outwardly from said housing and to which a lift cable is attached, and a second terminal end extending downwardly within said housing, said housing further including a pin mounted perpendicularly to said column and adapted to slidably fit into said apertures contained therein, said pin further including a tab projecting upwardly and contacting said second terminal and of said bent arm member, said housing further including means for biasing said pin against said apertures on said column whereby when tension is applied to said bent arm segment by said cable, said second terminal end of said arm contacts said tab of said pin to urge said pin away from contact with said apertures, and when said cable tension is released said pin is urged into contact with said apertures thereby locking the bed about the column, the tilting means further including an electric lift winch attached to said bed and positioned between said first and said second longitudinal members, the winch including said cable attached at one terminal end to said winch and passing upwards over said pulley, thence downwards to said housing cable attachment means whereby said first and said second longitudinal members may be raised relative to said first and second V-members; and a load winch means secured to and between said longitudinal members for loading a motor vehicle onto the tray.

* * * * *